(12) United States Patent
Cheston et al.

(10) Patent No.: US 6,601,097 B1
(45) Date of Patent: Jul. 29, 2003

(54) METHOD AND SYSTEM FOR DETERMINING THE PHYSICAL LOCATION OF COMPUTERS IN A NETWORK BY STORING A ROOM LOCATION AND MAC ADDRESS IN THE ETHERNET WALL PLATE

(75) Inventors: Richard W. Cheston, Morrisville, NC (US); Daryl C. Cromer, Apex, NC (US); Dhruv M. Desai, Cary, NC (US); Howard J. Locker, Cary, NC (US); James P. Ward, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/480,030

(22) Filed: Jan. 10, 2000

(51) Int. Cl.[7] ................. G06F 15/177; G06F 15/173; G06F 15/16; H04L 12/28
(52) U.S. Cl. .............. 709/222; 709/220; 709/224; 709/203; 370/254
(58) Field of Search ............... 709/223, 224, 709/220–226; 370/254

(56) References Cited

U.S. PATENT DOCUMENTS

| | | | |
|---|---|---|---|
| 5,226,120 A | | 7/1993 | Brown et al. |
| 5,559,955 A | | 9/1996 | Dev et al. |
| 5,572,640 A | | 11/1996 | Schettler |
| 5,606,664 A | | 2/1997 | Brown et al. |
| 5,684,796 A | | 11/1997 | Abidi et al. |
| 5,706,440 A | | 1/1998 | Compliment et al. |
| 5,745,682 A | * | 4/1998 | Keenan ................. 709/220 |
| 5,793,975 A | | 8/1998 | Zeldin |
| 5,909,429 A | * | 6/1999 | Satyanarayana et al. .... 370/254 |
| 6,131,119 A | * | 10/2000 | Fukui ................. 709/224 |
| 6,272,541 B1 | * | 8/2001 | Cromer et al. ............ 709/224 |
| 6,327,623 B2 | * | 12/2001 | Watts ................. 709/229 |
| 6,397,249 B1 | * | 5/2002 | Cromer et al. ............ 709/224 |
| 6,405,236 B1 | * | 6/2002 | Nieratschker .......... 709/200 |

* cited by examiner

*Primary Examiner*—David Wiley
*Assistant Examiner*—Joseph E. Avellino
(74) *Attorney, Agent, or Firm*—Sawyer Law Group, LLP; Carlos Munoz-Bustamante

(57) ABSTRACT

A method for determining the physical locations of a plurality of computers in a network is disclosed. The network includes a plurality of wall plates, each of the wall plates for coupling one of the computers to the network. The method and system comprises providing an additional information physical layer and logic in each of the wall plates. The method and system further comprises capturing and storing the system media access-controller (MAC) address of the connect computer in the additional logic of each of the plurality of wall plates and storing a physical address of the wall plate in the logic of each of the plurality of wall plates. The method and system also comprises providing a command from the network that will cause the system MAC address and the physical address of at least one of the plurality of computers to be provided to an application in the network. A system and method in accordance with the present invention adds a low cost physical layer and logic within an Ethernet wall plate associated with the computer on the network. The logic is designed to respond to a broadcast signal to a UDP (User Datagram Protocol) port. In so doing the physical location of the computer can be determined. In a preferred embodiment, a command is provided from the network that will cause the MAC address and the physical address of at least one of the plurality of computers to be provided to an inventory application in the network, thereby allowing a network administrator to remotely determine the physical location (room, floor, building, etc.) of any and all computers attached to the network.

24 Claims, 2 Drawing Sheets

METHOD AND SYSTEM FOR DETERMINING THE PHYSICAL LOCATION OF COMPUTERS IN A NETWORK BY STORING A ROOM LOCATION AND MAC ADDRESS IN THE ETHERNET WALL PLATE

FIELD OF THE INVENTION

The present invention relates in general to processing systems and, in particular, to a method and system for physically locating a computer in such a network.

BACKGROUND OF THE INVENTION

Personal computer systems are well known in the art. They have attained widespread use for providing computer power to many segments of today's modern society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM drive, a fixed disk storage drive (also known as a "hard drive"), a pointing device such as a mouse and an optional network interface adapter. One of the distinguishing characteristics of these systems is the use of a motherboard or system planar to electrically connect these components together.

A business may establish a network of such personal computers. The network provides for transmission of data. Manageability on large networks allows network administrators to update code (BIOS, OS, drivers, applications) or to inventory assets (memory, HDD, processors). However, it is impossible to determine where the computers are physically located. Since Ethernet is a broadcast medium, there is no mechanism to determine physical location.

This is a large problem for corporations who have thousands of computers on their network. It is important to determine physical location for repair actions, returning computers when leases expire, etc. Conventional solutions allow for the determination of whether if a computer is on the network, not physically where it is located.

Accordingly, a need exists for a data processing system and method to allow a network administrator to remotely determine the physical location (room, floor, building, etc.) of any and all computers attached to the network. The present invention addresses such a need.

SUMMARY OF THE INVENTION

A method for determining the physical locations of a plurality of computers in a network is disclosed. The network includes a plurality of wall plates, each of the wall plates for coupling one of the computers to the.network. The method and system comprises providing additional information using a physical layer and logic in each of the wall-plates. The method and system further comprises capturing and storing the system media access controller (MAC) address of the connect computer in the additional logic of each of the plurality of wall plates and storing a physical address of the wall plate in the logic of each of the plurality of wall plates. The method and system also comprises providing a command from the network that will cause the system MAC address and the physical address of at least one of the plurality of computers to be provided to an application in the network.

A system and method in accordance with the present invention adds a low cost physical layer and logic within an Ethernet wall plate associated with the computer on the network. The logic is designed to respond to a broadcast signal to a UDP (User Datagram Protocol) port. In so doing the physical location of the computer can be determined.

In a preferred embodiment, a command is provided from the network that will cause the MAC address and the physical address of at least one of the plurality of computers to be provided to an inventory application in the network, thereby allowing a network administrator to remotely determine the physical location (room, floor, building, etc.) of any and all computers attached to the network.

DETAILED DESCRIPTION

The present invention relates in general to processing systems and, in particular, to a method and system for physically locating a computer in such a network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
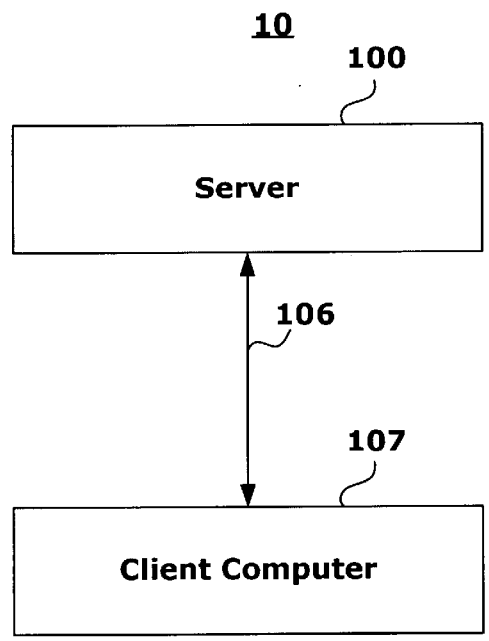
FIG. 1 illustrates a pictorial representation of a data processing system external to a secure network in accordance with the method and system of the present invention.

FIG. 1 illustrates a pictorial representation of a network including server and remote computer systems in accordance with the method and system of the present invention. Network 10 is controlled by server computer system 100 and includes a plurality of client computer systems, such as client computer system 107. Client computer systems have a communication link 106 established between client 107 and server 100. The communication link is preferably established utilizing Ethernet technology.

Figure 2:
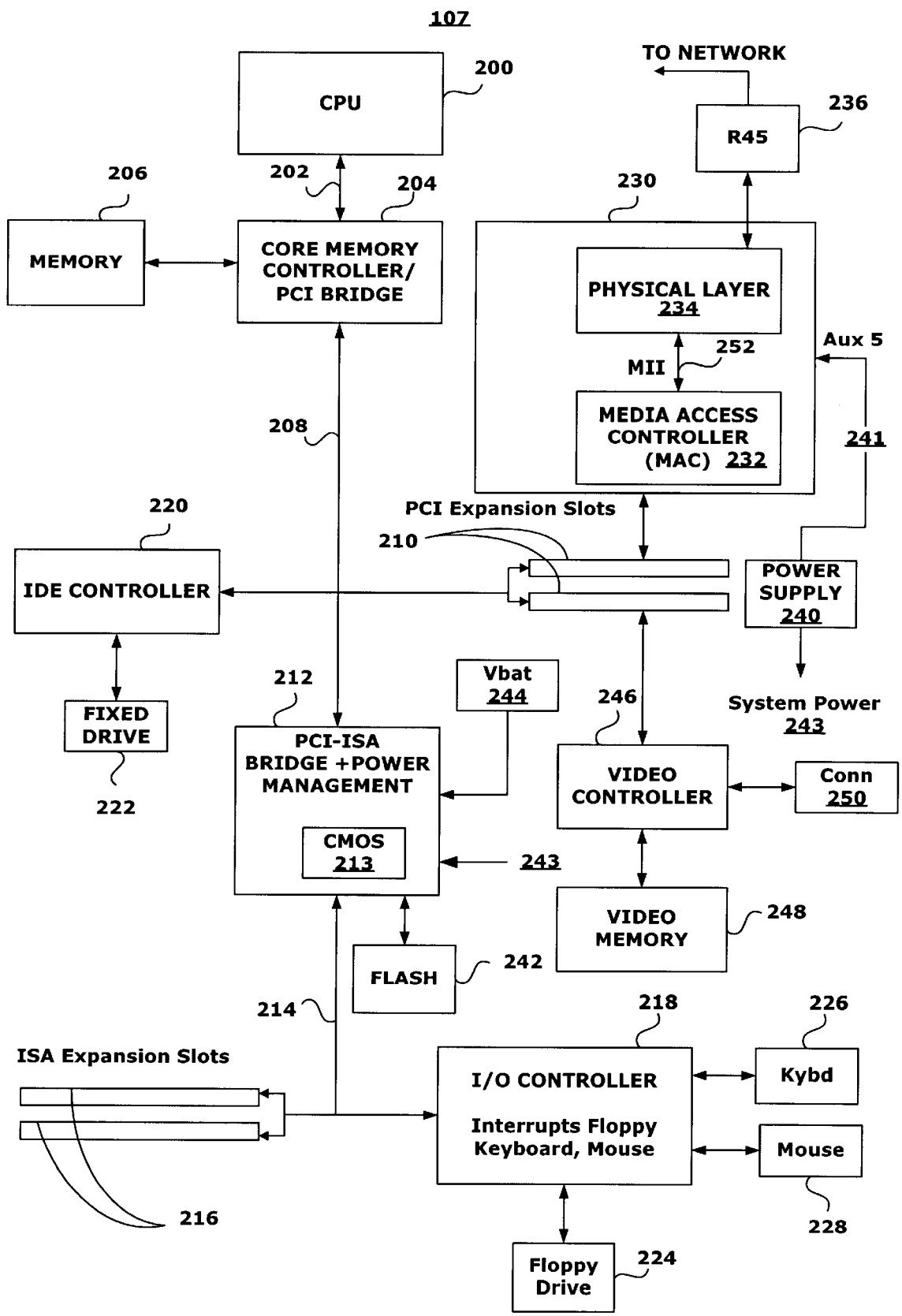
FIG. 2 depicts a more detailed pictorial representation of a client computer system in accordance with the method and system of the present invention.

FIG. 2 depicts a more detailed pictorial representation of a computer system 107 which also may be utilized to implement server 100 in accordance with the method and system of the present invention. Computer system 107 includes a planar (also commonly called a motherboard or system board) which is mounted within computer 107. The components of computer 107 including a central processing unit (CPU) 200, system memory 206, and accessory cards or boards as is well known in the art.

CPU 200 is connected by address, control, and data busses 202 to a memory controller and peripheral component interconnect (PCI) bus bridge 204 which is coupled to system memory 206. An integrated drive electronics (IDE) device controller 220, and a PCI bus to Industry Standard Architecture (ISA) bus bridge 212 are connected to PCI bus bridge 204 utilizing PCI bus 208. IDE controller 220 provides for the attachment of IDE compatible storage devices, such as a removable hard disk drive 222. PCI/ISA bridge 212 provides an interface between PCI bus 208 and an optional feature or expansion bus such as the ISA bus 214. PCI/ISA bridge 212 includes power management logic. PCI/ISA bridge 212 is supplied power from battery 244 to prevent loss of configuration data stored in CMOS 213.

A PCI standard expansion bus with connector slots 210 is coupled to PCI bridge 204. PCI connector slots 210 may receive PCI bus compatible peripheral cards. An ISA standard expansion bus with connector slots 216 is connected to PCI/ISA bridge 212. ISA connector slots 216 may receive ISA compatible adapter cards (not shown). It will be appreciated that other expansion bus types may be used to permit expansion of the system with added devices. It should also be appreciated that two expansion busses are not required to implement the present invention.

An I/O controller 218 is coupled to PCI-ISA bridge controller 212. I/O controller 218 controls communication between PCI-ISA bridge controller 212 and devices and peripherals such as floppy drive 224, keyboard 226, and mouse 228 so that these devices may communicate with CPU 200.

PCI-ISA bridge controller 212 includes an interface for a flash memory 242 which includes an interface for address, data, flash chip select, and read/write. Flash memory 242 is an electrically erasable programmable read only memory (EEPROM) module and includes BIOS that is used to interface between the I/O devices and operating system. Computer system 107 includes a video controller 246 which may, for example, be plugged into one of PCI expansion slots 210. Video controller 246 is connected to video memory 248. The image in video memory 248 is read by controller 246 and displayed on a monitor (not shown) which is connected to computer system 207 through connector 250.

Computer system 107 includes a power supply 240 which supplies full normal system power 243, and has an auxiliary power main AUX 5 241 which supplies full time power to the power management logic 212.

Computer system 107 also includes a network adapter 230. Network adapter 230 includes a physical layer 234 and a media access controller (MAC) 232 coupled together utilizing a Media Independent Interface (MII) bus 252. The MII bus 252 is a specification of, signals and protocols which define the interfacing of a 10/100 Mbps Ethernet Media Access Controller (MAC) 232 to the underlying physical layer 234. Network adapter 230 may be plugged into one of the PCI connector slots 210 (as illustrated) or one of the ISA connector slots 216 in order to permit computer 107 to communicate with proxy 102 utilizing communication link 108.

MAC 232 processes digital network signals, and serves as an interface between a shared data path, i.e., the MII bus 252, and the PCI bus 208. MAC 232 performs a number of functions in the transmission and reception of data packets. For example, during the transmission of data, MAC 232 assembles the data to be transmitted into a packet with address and error detection fields. Conversely, during the reception of a packet, MAC 232 disassembles the packet and performs address checking and error detection. In addition, MAC 232 typically performs encoding/decoding of digital signals transmitted over the shared path and performs preamble generation/removal, as well as bit transmission/reception. In a preferred embodiment, MAC 232 is an Intel 82557 chip. However, those skilled in the art will recognize that the functional blocks depicted in network adapter 230 may be manufactured utilizing a single piece of silicon.

Physical layer 234 conditions analog signals to go out to the network via an R45 connector 236. Physical layer 234 may be a fully integrated device supporting 10 and 100 Mbps CSMA/CD Ethernet applications. Physical layer 234 receives parallel data from the MII local bus 252 and converts it to serial data for transmission through connector 236 and over network 10. Physical layer 234 is also responsible for wave shaping and provides analog voltages to network 10. In a preferred embodiment, physical layer 234 is implemented utilizing an Integrated Services chip ICS-1890.

A system and method in accordance with the present invention adds a low cost physical layer and logic within an Ethernet wall plate associated with the computer on the network. The additional physical layer/subsystem is designed to respond to a broadcast signal to a UDP (User Datagram Protocol) port. In so doing the physical location of the computer can be determined.

Figure 3:
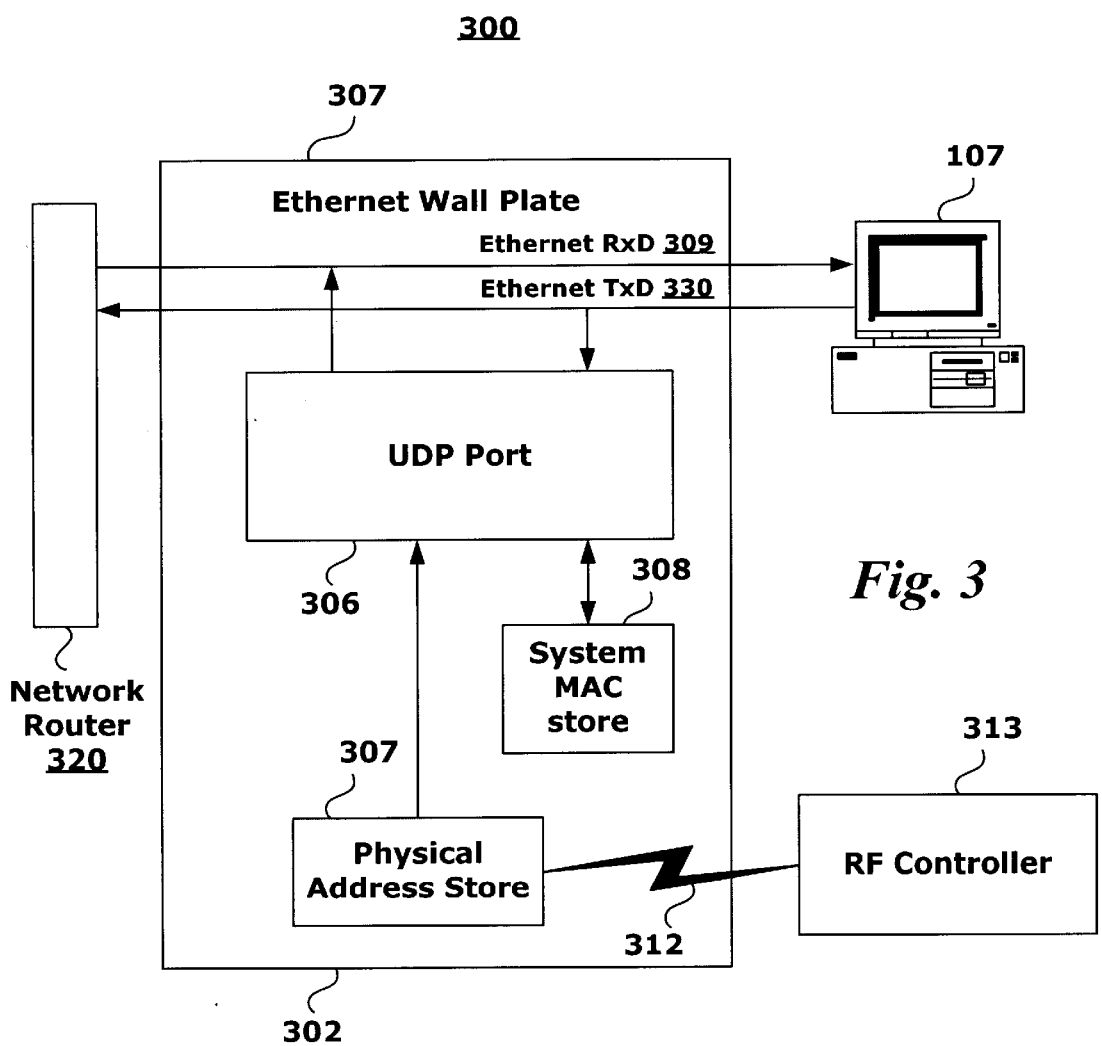
FIG. 3 is a block diagram of a system in accordance with the present invention.

To more particularly describe the features of the present invention, refer now to the following description and the accompanying figures. FIG. 3 is a block diagram of a system 300 in accordance with the present invention. This figure illustrates one computer system in a network which would advantageously utilize the concepts in accordance with the present invention. In a preferred embodiment each of the computers in the network would have the same features therewithin.

The system 300 includes an Ethernet wall plate 302 which couples the computer 107 with the network 320. The wall plate 302 provides signals from the network to the computer 107 and provides signals from the computer 107 to the network. Ethernet RxD [receive] data 309 and Ethernet TxD [transmit] 330 are coupled to computer 107 via a R45 connector 236 (FIG. 2) which is part of network adapter 230 (FIG. 2).

The Ethernet wall plate 302 includes an additional subsystem physical layer 306. In a preferred embodiment, the physical layer 306 only responds to a predefined number, a User Datagram Protocol (UDP) port.

The UDP port 306 receives data from the physical address storage 307 and system MAC storage 308. The System MAC storage 308 stores the MAC address of the Ethernet system of the computer connected to the Ethernet wall plate 302 by snooping the Ethernet Txd (Transmit Data) line 330 from the computer 107. The Ethernet Txd line 330 is active only when the computer 107 is transmitting Ethernet packets. Each Ethernet packet contains the MAC address of the computer connected to that Ethernet wall plate 302. The MAC address of the computer 107 comprises a unique number for each computer. The UDP port 306 parses the MAC address and stores it in the System MAC storage area 308. Snooping occurs every time a packet is transmitted on line 330. If computer 107 is replaced, the MAC address of the new computer is captured and detected.

The second storage physical storage area is the Physical Address Storage 308. The Physical Address Storage 308 includes in a preferred embodiment a wireless RF interface 312 as well as a direct connection to the UDP port 302. In a preferred embodiment, a hand held RF controller 313 is used to write in the physical location of the wall plate 302 into the Ethernet wall plate 302. The physical location information includes, for example, building number, floor and office. This information is written only when the wall plate is inserted into the wall. Therefore, the UDP port 306 will now contain the physical location of the wall plate and the MAC address of the computer 304 attached to the wall plate 302.

Accordingly, a UDP protocol is utilized by a software application in the network to send out a UDP command to a common UDP Port number for the inventory finction to every wall plate of the network. The software application is preferably an inventory application. In a preferred embodiment, a UDP port number used for inventory applications can be reserved by submitting a Request for Comments (RFC). Furthermore, the port number to the particular UDP port will then be assigned.

Accordingly, in a preferred embodiment each of the wall plates that have the UDP port will send an Ethernet packet containing the MAC address of the computer and the Physical Address of the wall plate when a command is provided from the network. The inventory application will then gather this information, and determine the actual physical location of each of the computers on the network.

A system and method in accordance with the present invention adds a low cost physical layer/subsystem within an Ethernet wall plate associated with the computer on the network. The additional physical layer/subsystem is designed to respond to a broadcast signal to a UDP (User Datagram Protocol) port. In so doing the physical location of the computer can be determined.

Although the present invention-has-been described in accordance with the embodiments shown, one of ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for determining the physical locations of a plurality of computers in a network, the network including a plurality of wall plates, each of the wall plates for coupling one of the computers to the network, the method comprising the steps of:

(a) providing a physical layer and logic within each of the wall plates;

(b) providing a system media access controller (MAC) address in the logic of each of the plurality of wall plates;

(c) providing a physical address in the logic of each of the plurality of wall plates; and (d) providing a command from the network that will cause the system MAC address and the physical address of at least one of the plurality of computers to be provided to an application in the network.

2. The method of claim 1 in which the physical layer comprises a User Datagram Protocol (UDP) port.

3. The method of claim 1 in which each of the plurality of wall plates comprises an Ethernet wall plate.

4. The method of claim 1 wherein the application comprises an inventory application.

5. The method of claim 1 wherein a wireless interface is utilized to write the physical location of a computer into the wall plate.

6. The method of claim 1 wherein the system MAC address comprises a unique number for each of the plurality of computers.

7. The method of claim 1 wherein the physical address comprises the physical location information of the computer.

8. The method of claim 7 wherein the physical location information includes a building number, floor, and office where the computer is located.

9. A system for determining a physical location of a computer coupled to a wall plate in a network comprising:

a physical layer and logic within the wall plate coupled between the computer and the network;

a first address storage element for providing a system media access controller (MAC) address for the logic; and a second address storage element for providing a physical address to the logic; wherein a command from the network will cause the system MAC address and the physical address to be provided to an application in the network.

10. The system of claim 9 in which the physical layer comprises a User Datagram Protocol (UDP) port.

11. The system of claim 9 in which the wall plate comprises an Ethernet wall plate.

12. The system of claim 9 wherein the application comprises an inventory application.

13. The system of claim 9 wherein a wireless interface is utilized to write the physical location of a computer into the wall plate.

14. The system of claim 9 wherein the system MAC address comprises a unique number for the computer.

15. The system of claim 9 wherein the physical address comprises the physical location information of the computer.

16. The system of claim 15 wherein the physical location information includes a building number, floor, and office where the computer is located.

17. A system for determining the physical locations of a plurality of computers in a network, the network including a plurality of wall plates, each of the wall plates for coupling one of the computers to the network, the system comprising:

means for providing a physical layer and logic within each of the wall plates;

means for providing a system media access controller (MAC) address in the logic of each of the plurality of wall plates;

means for providing a physical address in the logic of each of the plurality of wall plates; and means for providing a command from the network that will cause the system MAC address and the physical address of at least one of the plurality of computers to be provided to an application in the network.

18. The system of claim 17 in which the physical layer comprises a User Datagram Protocol (UDP) port.

19. The system of claim 17 in which each of the plurality of wall plates comprises an Ethernet wall plate.

20. The system of claim 17 wherein the application comprises an inventory application.

21. The system of claim 17 wherein a wireless interface is utilized to write the physical location of a computer into the wall plate.

22. The system of claim 17 wherein the system MAC address comprises a unique number for each of the plurality of computers.

23. The system of claim 17 wherein the physical address comprises the physical location information of the computer.

24. The system of claim 23 wherein the physical location information includes a building number, floor, and office where the computer is located.

* * * * *